United States Patent
Fischer et al.

(10) Patent No.: US 7,290,923 B2
(45) Date of Patent: Nov. 6, 2007

(54) EXTRUDER/GEAR PUMP ASSEMBLY

(75) Inventors: Florian W. Fischer, Ebersberg (DE); Uphus Reinhard, Hannover (DE)

(73) Assignee: Berstorff GmbH, Hannover (DE)

( * ) Notice: Subject to any disclaimer, the term of this patent is extended or adjusted under 35 U.S.C. 154(b) by 372 days.

(21) Appl. No.: 11/090,126

(22) Filed: Mar. 28, 2005

(65) Prior Publication Data
US 2005/0220919 A1   Oct. 6, 2005

Related U.S. Application Data

(63) Continuation of application No. PCT/EP03/09021, filed on Aug. 14, 2003.

(30) Foreign Application Priority Data
Sep. 27, 2002   (DE)   ................ 102 45 306

(51) Int. Cl.
*B29C 47/42* (2006.01)
(52) U.S. Cl. ............... 366/77; 366/83; 366/294; 417/205
(58) Field of Classification Search .......... 366/77, 366/80–83, 85, 294; 417/205; 418/61.1; 425/204, 205
See application file for complete search history.

(56) References Cited

U.S. PATENT DOCUMENTS

| 2,785,438 | A | * | 3/1957 | Willert | .................. | 366/81 |
| 3,307,489 | A |   | 3/1967 | Eckerle et al. | | |
| 3,929,322 | A | * | 12/1975 | Hanslik | .................. | 366/85 |
| 4,268,176 | A | * | 5/1981 | Muller | .................. | 366/83 |
| 4,289,409 | A |   | 9/1981 | Brand | | |
| 4,642,040 | A |   | 2/1987 | Fox | | |
| 4,889,430 | A | * | 12/1989 | Mueller | .................. | 366/85 |
| 6,799,881 | B2 |   | 10/2004 | Fischer | | |
| 6,974,310 | B2 | * | 12/2005 | Uphus | .................. | 417/205 |

FOREIGN PATENT DOCUMENTS

| DE | 197 17 455 A1 | 10/1998 |
| DE | 100 49 730 A1 | 4/2002 |
| EP | 0 508 285 B1 | 12/1994 |
| EP | 0 445 584 B1 | 10/1996 |
| EP | 1310347 | 5/2003 |
| GB | 855 362 | 11/1960 |
| WO | WO 00/61947 | 10/2000 |

OTHER PUBLICATIONS

European Office Action dated Jul. 25, 2005 with English translation.

\* cited by examiner

*Primary Examiner*—David Sorkin
(74) *Attorney, Agent, or Firm*—Crowell & Moring LLP

(57) ABSTRACT

An extruder/gear pump assembly is provided having an extruder screw connected to the gear pump. The relative speed of the extruder screw and the gear pump are adjustable by the use of a shaft housed in a cavity of the extruder screw.

18 Claims, 2 Drawing Sheets

EXTRUDER/GEAR PUMP ASSEMBLY

CROSS-REFERENCE TO RELATED APPLICATIONS

This application is a continuation of PCT Application No. PCT/EP2003/009021 filed on Aug. 14, 2003, which claims priority to German Application No. 102 45 306.3 filed Sep. 27, 2002.

BACKGROUND AND SUMMARY OF THE INVENTION

The invention relates to an extruder/gear pump assembly having an extruder screw and a gear pump coupled thereto.

Constructions consisting of gear pumps and extruders have been known for a long time. In the case of the gear pumps connected to the output side of extruders, a fairly high feeding pressure can be built up by means of the gear pump. A corresponding example is the solution known from U.S. Patent document U.S. Pat. No. 4,642,040. In this solution, the extruder screw can be connected to the external shaft, which is connected with a variable transmission. A gear pump can be driven by way of a special transmission. In this solution, a diagonal duct is provided on the output side of the extruder, which has the purpose of feeding the gear pump. This solution illustrated in FIG. 6 of U.S. Pat. No. 4,642,040 requires fairly high expenditures. For example, the duct between the extruder screw and the gear pump may require additional heating.

In another embodiment of this solution known from U.S. Pat. No. 4,642,040, the gear pump is driven by way of a special shaft arrangement, the drive connection branching off the driving motor for the extruder screw. Here, a multiple diversion by way of slave transmissions and, additionally, the use of a variable transmission are required. The patent document already implies that further development with various and, primarily, long external shafts in that document is disadvantageous.

Various attempts to improve this solution have become known. For example, another combination of an extruder and a gear pump has become known from European Patent document EP-A1-508 285. This construction is aimed particularly at the further development of a gear pump and provides a separate drive for the gear pump. In this case, it is a disadvantage that the two drives must be mutually synchronized in a special manner in order to achieve the desired pressure conditions.

Furthermore, a combination of an extruder and a gear pump was suggested in German Patent document DE-A1 100 49 730, in which the gear pump is flangedly connected directly to the extruder screw. This solution avoids long flow paths, is compact and, therefore, not susceptible to disturbances. However, it would be desirable to obtain a better sealing-off of the high-pressure area. Thus, on the output side of the gear pump, this solution additionally has the serious disadvantage that the rotational speed of the gear pump is coupled to the rotational speed of the extruder screw. However, for different rubber and thermoplastic mixtures, different relative rotational speeds are required, so that this solution can be used only for one rubber or thermoplastic mixture or for a rubber or thermoplastic mixture of the same type.

It is, therefore, an aspect of the invention to provide a combined extruder/gear pump assembly, having an extruder screw and a gear pump coupled thereto, which avoids the disadvantages of long flow paths, in which case a controlling of the operating point should nevertheless be possible without requiring a plurality of drives.

According to the invention, a gear pump shaft is disposed in the hollow extruder screw, by way of which gear pump shaft the relative speed of the extruder screw and the gear pump can be adjusted. Advantageous further developments are described and claimed herein.

Extruders frequently have a considerable length, particularly when they are used for mixed purposes and, therefore, for example, have transfer areas. An extruder screw intended for this purpose will then no longer be self-supporting but run in the extruder housing. In order to improve the efficiency of the mixing, it is advantageous to select a relatively large diameter for the extruder screw at its outer circumference. This is accompanied by an enlargement of the diameter of the extruder screw core. In order to minimize the abrasion in the screw housing, hollow extruder screws are advantageous.

Such extruder screws have the advantage of a comparatively low weight and of a good rigidity, so that the wear between the extruder screws and the extruder housing is reduced.

An extruder screw which has a correspondingly favorable construction can very advantageously be used according to the invention.

The extruder screw constructed as a hollow shaft is used for the accommodation of a drive shaft for the gear pump. A large number of advantages can be achieved by means of this surprisingly simple measure.

First, a separate sealing-off of the hollow shaft at its end can be eliminated. By way of the gear pump, the extruder screw can be disposed on the end side, so that the wear by friction between the screw housing and the extruder screw is particularly low.

As a result of the implementation of a hollow shaft, the tendency to bend is considerably reduced even in the case of fairly long extruders. According to the invention, it is particularly favorable that the gear pump can be controlled despite the integration in the extruder screw. It is particularly advantageous that, as a result of the automatic taking-along of the planet carrier with the extruder screw, only the relative rotational speed and, thus, the relative delivery rate can be adjusted. Therefore, when the extruder and thus the main drive moves down, the planetary gear pump is also controlled down, so that the control is simplified.

For this purpose, it is particularly advantageous for a series planetary gear set to be provided between the gear pump drive shaft and an intermediate shaft, whose ring gear on the inside is formed by the extruder screw. Thus, different compounds and thermoplastic mixtures can also be optimally delivered without the risk of damage to the material.

Furthermore, it is particularly advantageous according to the invention that, despite the use of an internal transmission for providing the adjustability of the relative rotational speed, only a single sealing device is required for protecting the transmission from the elastomer masses. In addition, this sealing device is situated on the input side of the gear pump, thus not yet in the high pressure area, so that it is less stressed than a sealing device in the high-pressure area. In practice, it is additionally situated in the area of the suction side of the planetary gear pump, which further reduces the stressing of the sealing device.

By providing inlet and outlet openings adjacent to the outer circumference of the planetary gear pump, a favorable rate of delivery is achieved while the shearing stress to the material is, simultaneously, not excessively high, and the material exiting from the gear pump can be removed by way of an outlet cone in a manner advantageous to the flow.

Additional advantages, details and characteristics are contained in the following description of an embodiment of the invention by means of the drawing.

DETAILED DESCRIPTION OF THE DRAWINGS

Figure 1:
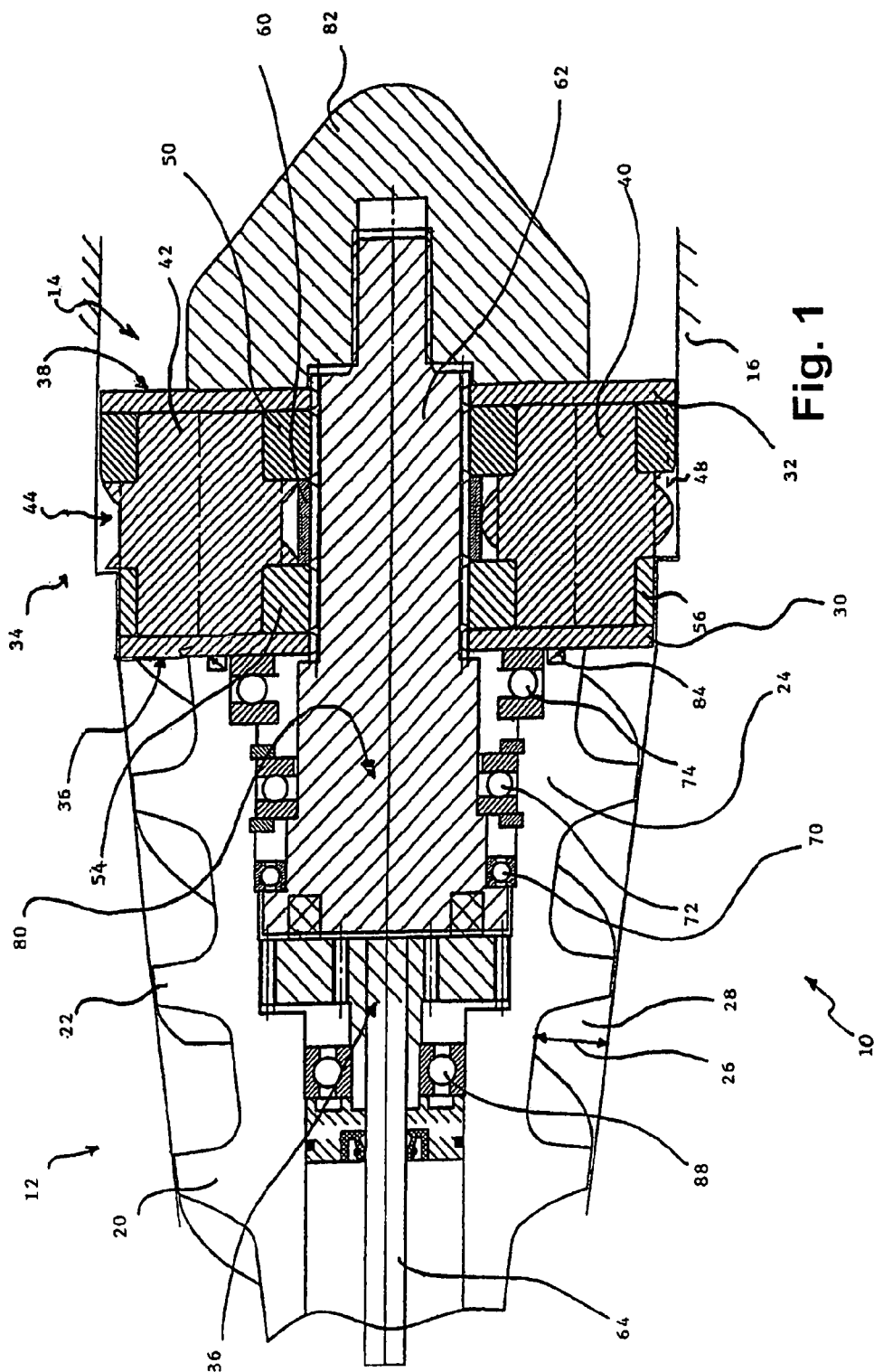
FIG. 1 is a sectional view of part of an extruder/gear pump assembly according to the invention in an embodiment.

The extruder/gear pump assembly 10 illustrated in FIG. 1 has an extruder 12 and a planetary gear pump 14. The extruder 12 and the gear pump 14 are accommodated in a joint housing 16. The extruder has a hollow extruder screw 20 which, in a manner known per se, is equipped with an extruder spiral 22 which is arranged on a screw core 24.

The screw core 24 is widened toward the planetary gear pump 14. The depth 26 of the screw grooves 28 remains essentially the same, so that the extruder helix 22 also extends correspondingly conically at its outer circumference. The housing 16 has a corresponding inner cone, in which housing 16, the extruder screw 20 is guided in an essentially play-free manner which is known per se.

On the output side, the extruder screw 20 is followed by the gear pump 14. The gear pump 14 has a first planet carrier disk 54, 56 and a second planet carrier disk 50, which together form the planet carrier 34. The first planet carrier disk 54, 56 has a plurality of inlet openings, of which one inlet opening 36 is illustrated in FIG. 1 with respect to the arrangement. Correspondingly, the second planet carrier disk 50 has a plurality of outlet openings, of which one outlet opening 38 is illustrated in FIG. 1 with respect to the arrangement.

The first planet carrier disk, whose outer areas are marked by reference number 56 and whose inner areas are marked by reference number 54, is covered by a covering wall 30. The covering wall 30 seals off the face of the planet gears 40, 42 which penetrate the first planet carrier disk 54, 56 and are disposed in the latter. Furthermore, a second covering wall 32 is provided, which covers the rearward, second planet carrier disk 50, on the outlet side. In the covering walls 30 and 32, respective openings are provided which correspond to the inlet openings 36 and to the outlet openings 38.

In a top view of the first covering wall 30, viewed from the direction of the extruder screw, the inlet openings are provided between two adjacent planet gears. In FIG. 1, the planet gears 40 and 42 are illustrated.

The planet gears are uniformly and, therefore, circumferentially distributed. Sloped walls, which are not visible in FIG. 1, extend between the planet gears. The delivery of material takes place in a known manner described in German Patent document DE-OS 100 49 730, the entire content of which is expressly incorporated herein by reference as non-essential subject matter.

The planet gears have a helical gearing 44. In FIG. 1, the helical gearing for planet gear 40 is shown differently than the helical gearing 44 for the planet gear 42. This is the result of the different angle of rotation in the illustration, which, on the one side, intersects the corresponding teeth laterally and, on the other side, in the center.

The helical gears are held in such a manner that they mesh with a ring gear 48, which is fixed to the housing and which has a corresponding helical gearing.

As a result of the solution according to the invention, a particularly large portion of the cross-sectional surface of the gear pump can be filled with the planet gears, so that the operation of the gear pump according to the invention is particularly stable with respect to pressure.

The planet carrier disks 50, 54 and 56, respectively extend laterally of the helical gearing 44 in the manner illustrated in FIG. 1, the planet carrier disks being equipped with an internal toothing.

At reference number 56, the first planet carrier disk has an outside diameter which is slightly smaller than the outside diameter of the planet carrier disk 50 and corresponds to the outside diameter of the extruder screw at its gear-pump-side end.

The drive of the planetary gear pump according to the invention takes place by way of a drive of the planet carrier 62. The covering walls 30 and 32 are also equipped with an internal toothing. These internal toothings, as well as the internal toothings of the planet carrier disks 50, 54 and 56, as well as the internal toothing of a separating body 60 arranged in-between, are fitted onto an external toothing of an intermediate shaft 62 in a formlockingly driven manner, which intermediate shaft 62, according to the invention, is non-rotatably connected with a gear pump shaft 64, as will be explained in the following.

The intermediate shaft 62 is supported in the extruder screw 20 by way of a radial ball bearing 70. Additionally, by way of two axial ball bearings 72 and 74, a support takes place in each case at shoulders in a corresponding widening 80 of a hollow extruder screw 20 at its gear-pump-side end. An outlet cone 82 is screwed at the end side onto the intermediate shaft 62 and is supported against the covering wall 32. A sealing ring 84 is embedded on the face of the extruder screw 20 and has a sealing effect in the radial direction against the entering of material into the area of the intermediate shaft 62 against the covering wall 30.

The intermediate shaft 62 simultaneously forms a planet carrier for a planetary transmission 86 whose sun gear is connected with the gear pump shaft 64. The ring gear 48 of the planetary transmission 86 is constructed as an internal toothing of the widening of the extruder screw 20. It is understood that, in a manner known per se, the step-down ratio can be adjusted by the selection of the diameter of the planet gears and of the sun gear of the planetary transmission 86.

The gear pump shaft 64 is supported by way of another radial ball bearing 88 in the hollow extruder screw 20.

By the use of this arrangement, the gear pump 14 can be driven by the hollow extruder screw 20. Even when the relative speed between the gear pump shaft 64 and the extruder screw 20 is zero, the gear pump 14 is driven with its gear pump carrier 34. As a result of the advancing or the lagging of the drive of the gear pump shaft 64 with respect to the extruder screw 20, the relative rotational speed of the gear pump 14 with respect to the extruder screw 20 can be adjusted and, in wide ranges, can be adapted to the requirements, thus, to the material to be delivered.

Figure 2:
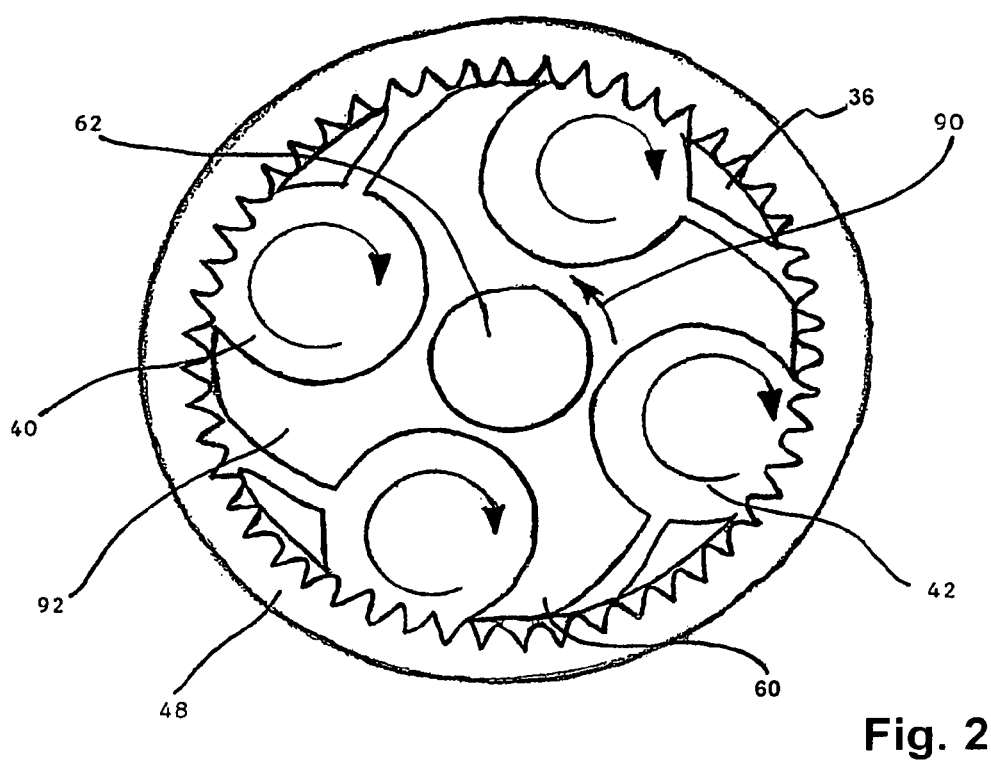
FIG. 2 is a sectional view of the gear pump part of the embodiment according to FIG. 1.

FIG. 2 is a sectional view of the gear pump. The shape of the separating body 60 is easily visible, the solution illustrated here being intended for four planet gears. The planet gears 40 and 42 roll off on the ring gear 48 when they are rotated, guided by the planet carrier 34. The rotating direction of the planet carrier 34 corresponds to the rotating direction of the separating body 60, which are both connected by a corresponding toothing with the intermediate shaft 62. This is illustrated by the arrow 90. In a manner known per se, the planet gears rotate in the reverse direction. On its outer circumference on which it forms the sloped walls 92, the separating body 60 has a tangential dimension which extends along approximately one and a half times the width of the tooth face of the ring gear 48. As a result, an overflowing on the outside at the separating body 60 can be reliably prevented.

The operation of the extruder/gear pump assembly 10 according to the invention takes place such that the rotational speed ratio between the gear pump shaft 64 and the extruder screw 20 is preselected first. By way of a correspondingly variable continuous transmission, this ratio can be adjusted without the requirement of two drives. The adjustment takes place as a function of the material. Even during the starting operation, the extruder screw and the gear pump begin to run at the desired rotational speed ratio. The extruder 12 builds up an input pressure at the inlet opening 36. By means of the drive of the gear pump 14 by way of the intermediate shaft 62, material is delivered to the outlet openings 38 by the movement of the sloped walls.

The material passes through between the planet gears, which are not in a mutual thread engagement, on their exterior areas but, in the same manner, also on their interior areas, the further development according to the invention avoiding virtually completely that a return flow is created.

The delivered material is applied at a high delivery pressure to the output side of the assembly according to the invention. In this case, it is understood that the outlet area can be constructed in any suitable fashion.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An extruder/gear pump assembly, comprising:
   a hollow extruder screw;
   a gear pump coupled to the extruder screw; and
   a gear pump shaft disposed in the hollow extruder screw through which a relative speed of the extruder screw and the gear pump is adjustable.

2. The extruder/gear pump assembly according to claim 1, wherein the gear pump is constructed as a planet gear pump.

3. The extruder/gear pump assembly according to claim 2, wherein the gear pump shaft is non-rotatably connected with a planet gear carrier of the planet gear pump.

4. The extruder/gear pump assembly according to claim 3, wherein the planet carrier of the gear pump is non-rotatably connected with an intermediate shaft, which intermediate shaft is in a transmission connection with the gear pump shaft.

5. The extruder/gear pump assembly according to claim 2, wherein a planet carrier of the gear pump has a first planet carrier disk and a second planet carrier disk, and further wherein planet gears extend and are disposed between the disks, the first planet carrier disk having inlet openings and the second planet carrier disk having outlet openings.

6. The extruder/gear pump assembly according to claim 5, wherein the first planet carrier disk is covered by a first covering wall, which extends toward the extruder screw, moves along with the first planet carrier disk, and has openings corresponding to the inlet openings, and further wherein a second covering wall is provided which covers the second planet carrier disk, moves along with the second planet carrier disk, and has openings corresponding to the outlet openings.

7. The extruder/gear pump assembly according to claim 5, wherein sloped walls extend between the first planet carrier disk and the second planet carrier disk of the planet carrier, the sloped walls being aligned opposite to a spiral direction of the extruder screw.

8. The extruder/gear pump assembly according to claim 7, wherein the gear pump has a helical gearing.

9. The extruder/gear pump assembly according to claim 8, wherein an inclination angle of the sloped walls and of the helical gearing is essentially the same and amounts to about between 5° and 25°.

10. The extruder/gear pump assembly according to claim 7, further comprising a separating body extending between the planet gears, which surrounds an intermediate shaft and is non-rotatably connected therewith, and which forms the sloped walls.

11. The extruder/gear pump assembly according to claim 5, wherein a core diameter of the extruder screw corresponds essentially to, or is slightly larger than, a diameter of a circle of axes set by the movement of the axes of the planet gears relative to a gear-pump-side end of the extruder screw.

12. The extruder/gear pump assembly according to claim 5, wherein the inlet openings and the outlet openings in the first planet carrier disk and the second planet carrier disk, respectively, of the gear pump extend in the radially outer third of the disks.

13. The extruder/gear pump assembly according to claim 5, wherein the inlet openings and the outlet openings in the first planet carrier disk and the second planet carrier disk, respectively, of the gear pump extend in the radially outer third of the disks, and wherein an extruder core diameter is flush with a radially inner end of the inlet and outlet openings.

14. The extruder/gear pump assembly according to claim 13, wherein the inlet and outlet openings extend in the radially outer core of the disks.

15. The extruder/gear pump assembly according to claim 5, wherein a gear pump housing in an area of a toothing of the planet gears is constructed as a ring gear.

16. The extruder/gear pump assembly according to claim 1, further comprising:
   a transmission connection between the gear pump shaft disposed in the hollow extruder screw and the gear pump;
   wherein the extruder screw forms a ring gear of a planetary transmission connection.

17. The extruder/gear pump assembly according to claim 1, wherein a diameter of a core of the hollow extruder screw increases toward the gear pump, and further wherein the extruder screw is widened toward the gear pump.

18. The extruder/gear pump assembly according to claim 1, wherein an interior widening of the hollow extruder screw accommodates a transmission between the gear pump shaft and the gear pump.

* * * * *